United States Patent
Groff

(10) Patent No.: US 11,266,084 B2
(45) Date of Patent: Mar. 8, 2022

(54) CROP PLANTING SYSTEM

(71) Applicant: Michael Groff, Middlebury, IN (US)

(72) Inventor: Michael Groff, Middlebury, IN (US)

(*) Notice: Subject to any disclaimer, the term of this patent is extended or adjusted under 35 U.S.C. 154(b) by 0 days.

(21) Appl. No.: 16/863,377

(22) Filed: Apr. 30, 2020

(65) Prior Publication Data
US 2021/0337746 A1    Nov. 4, 2021

(51) Int. Cl.
*A01G 13/02*    (2006.01)
*A01C 14/00*    (2006.01)

(52) U.S. Cl.
CPC .......... *A01G 13/0275* (2013.01); *A01C 14/00* (2013.01); *A01G 13/0256* (2013.01); *A01G 13/0268* (2013.01); *A01G 2013/0218* (2013.01)

(58) Field of Classification Search
CPC ............ A01G 13/0256; A01G 13/0268; A01G 13/0275
USPC .......... 47/9, 20.1, 29.1, 29.7, 32, 32.3, 32.7, 47/32.8, 58.1 R, 58.1 SC
See application file for complete search history.

(56) References Cited

U.S. PATENT DOCUMENTS

| | | | | |
|---|---|---|---|---|
| 3,698,131 A * | 10/1972 | Kesinger | A01G 9/242 47/29.1 |
| 3,975,859 A * | 8/1976 | Muller | A01G 13/0231 47/31 |
| 4,798,023 A * | 1/1989 | Morssinkhof | A01G 13/0231 47/32 |
| 4,818,579 A * | 4/1989 | Uchida | C02F 3/10 428/102 |
| 5,048,228 A * | 9/1991 | Neveu | A01G 9/1438 47/9 |
| 5,070,641 A * | 12/1991 | Brockington | A01G 13/0268 47/9 |
| 6,415,734 B1 * | 7/2002 | LaPuzza | G01C 11/00 116/201 |
| 6,701,664 B2 * | 3/2004 | Ahm | A01C 1/042 111/199 |
| 8,316,768 B2 * | 11/2012 | Reistroffer | F42B 12/44 102/302 |
| 8,726,565 B2 * | 5/2014 | McGrady | A01G 25/02 47/56 |
| 2014/0352208 A1 * | 12/2014 | Makropoulos | A01G 13/0206 47/31.1 |

FOREIGN PATENT DOCUMENTS

RU         2194554         * 12/2002

* cited by examiner

*Primary Examiner* — David J Parsley
(74) *Attorney, Agent, or Firm* — Botkin & Hall, LLP

(57) ABSTRACT

A method for planting crops that involves covering the planted seeds of the crop with an elongate sheet of mulch. The elongate sheet of mulch has lateral edges that determine its width. A combustible cord that is affixed to it between the lateral edges. The combustible cord may be formed within plies of the mulch or adhered thereto. The mulch is placed over the planted crop and held in place over the crop. This may be done by burying lateral edges of the mulch. When a user of the mulch wishes to remove the mulch, he will burn the combustible cord and that will separate the mulch along the cord.

8 Claims, 3 Drawing Sheets

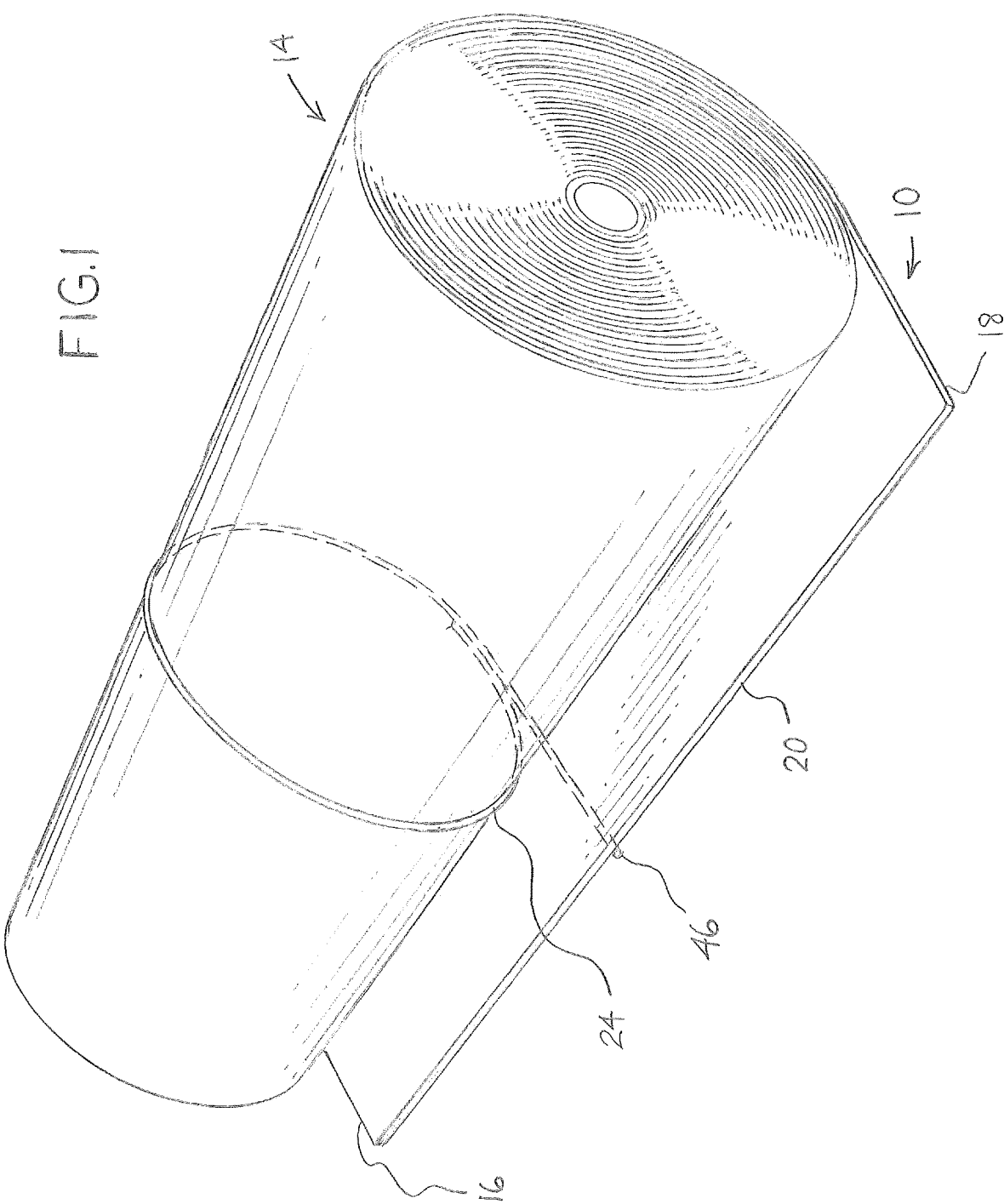

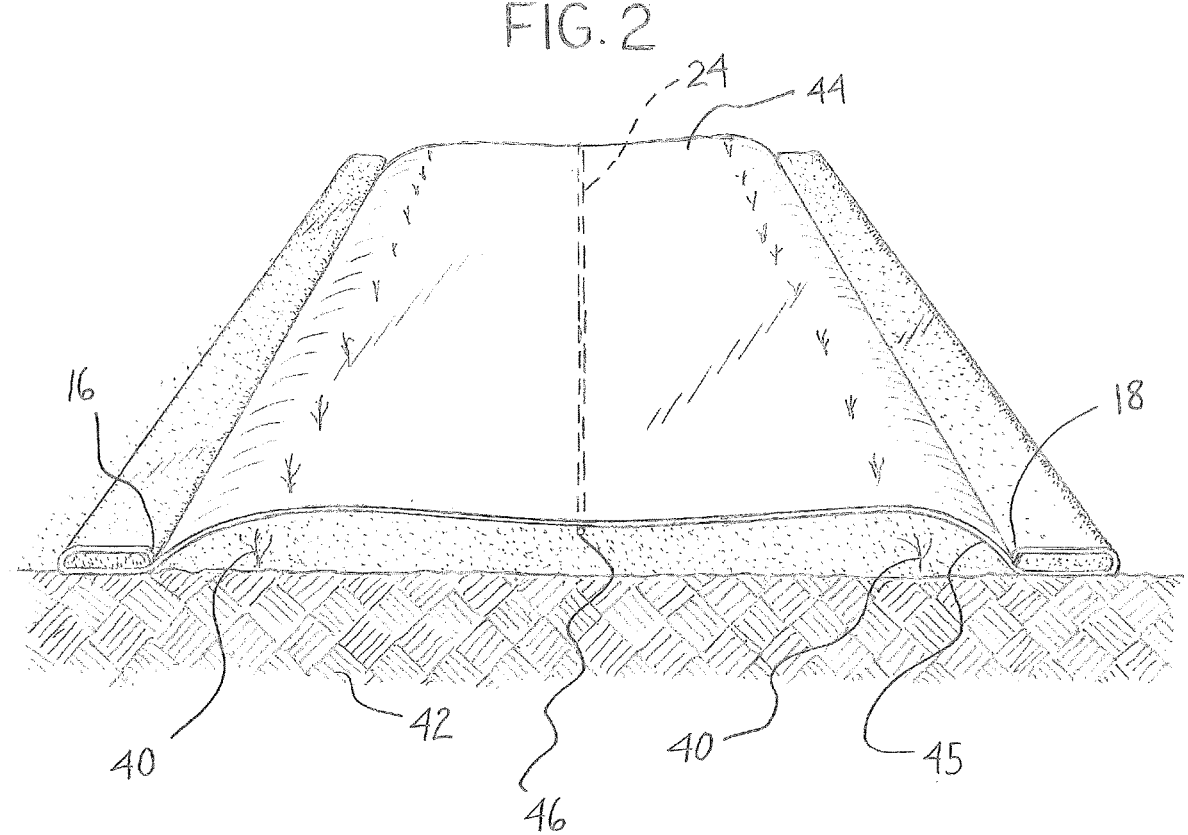
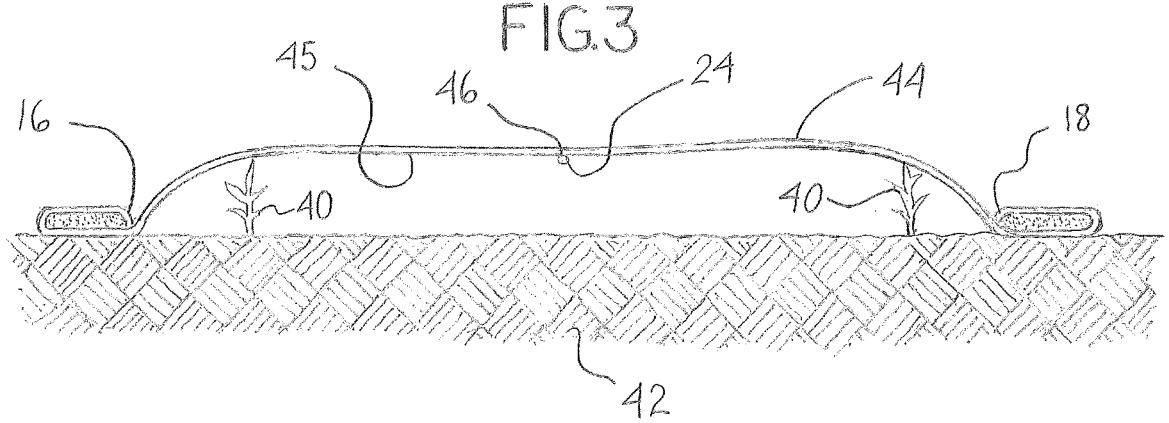

CROP PLANTING SYSTEM

BACKGROUND OF THE INVENTION

Polymer mulch is beneficial for certain crops and has been used with plants for some time. The mulch is usually supplied on rolls. Once the crop the mulch is intended to cover is planted, the mulch is rolled out over the crop. For the mulch to work effectively, it must be held down over the crop it covers, and that is typically done by burying the lateral edges of the mulch. As such, the mulch provides a protective canopy. The protective canopy of the polymer mulch is useful for enhancing soil temperature that can effectively lengthen a growing season by maintaining and stabilizing soil temperature. Polymer mulch can also keep moisture in the soils near the plants and maintains continuous moisture contact with seeds to enhance germination. At the same time the mulch can prevent the growth of weeds near the crop that the mulch covers.

Polymer mulch in many cases has a useful life during which it is beneficial to the crop. After that time, the mulch needs to be removed because no further benefit will be derived from its continued use or its continued use may be detrimental. In recent years biodegradable mulch has been tried that disintegrates once its usefulness is over. However, biodegradable mulch is not a controlled way to remove mulch at a desired time. Further, it does not allow flexibility to change the time when the mulch could be removed based on the conditions at the time it is used. In some instances it may be desirable to remove the mulch sooner or later than it would degrade on its own. There is need to have mulch that can be removed precisely when a user of the mulch deems appropriate.

SUMMARY OF THE INVENTION

A method for planting crops that involves covering the planted seeds of the crop with an elongate sheet of mulch. The elongate sheet of mulch has lateral edges that determine its width. The mulch has a combustible cord that is affixed to it between the lateral edges. The mulch is placed over the planted crop and held in place over the crop. This may be done by burying lateral edges of the mulch. When a user of the mulch wishes to remove the mulch, he will burn the combustible cord and that will separate the mulch along the cord.

BRIEF DESCRIPTION OF THE DRAWINGS

FIG. 1 shows a roll of the polymer mulch material;

FIG. 2 shows the mulch material in FIG. 1 applied over the soil in which crops are planted;

FIG. 3 is a view to the mulch material in FIGS. 1 and 2 applied over the soil viewed orthogonal to the direction in which the mulch material is applied to the soil.

DETAILED DESCRIPTION OF INVENTION

Figure 4:
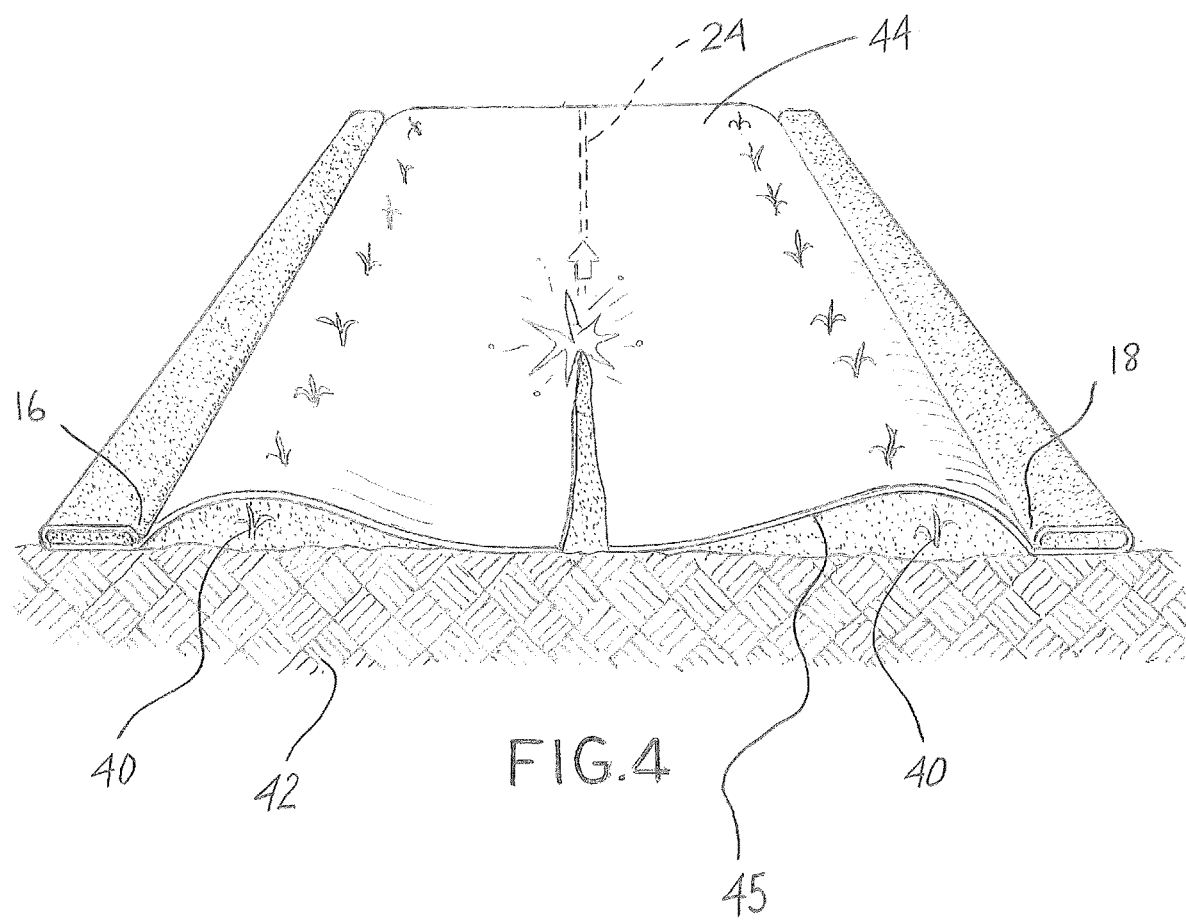
FIG. 4 is a view of the mulch material being separated by a burning cord that is affixed to the mulch material.

According to the present invention, an elongate sheet of plastic or polymer mulch 10 is provided. The polymer mulch sheet 10 is a relatively thin and flexible sheet that may be made of polyethylene or other formulations. In light of concerns that plastic may become a permanent fixture of the land, or accidentally be harvested with crops, the mulch 10 may be made of a biodegradable plastic. It should be noted that plants 40 and crop will be used interchangeably throughout the specification. Typically, the mulch 10 is transparent. However, the mulch 10 may be made of tinted or opaque material depending on the crop that it will cover. The mulch 10 is provided on a roll 14 for convenient transportation and storage before its use in a field. The mulch 10 has lateral edges 16, 18 that determine its width. The mulch 10 has a starting end 20 that is shown exposed in FIG. 1. In the case of the mulch in FIG. 1, it is transparent and shows a combustible cord 24 that is in the middle between the lateral edges 16, 18. The roll of mulch 10 may include a center roll made of cardboard or other material, or for efficiency, the mulch 10 may be rolled upon itself to save a user of the mulch 10 from having to dispose of extraneous waste in the form of a center tube.

The centrally located combustible cord 24 is adhered to the mulch 10. It is also contemplated that the combustible cord 24 could be sandwiched between multiple layers making up the mulch 10 in the case that the mulch 10 is formed of multiple plies. For its most effective use, the combustible cord 24 should be in direct contact with the mulch 10. It is also contemplated that the combustible cord 24 for the mulch 10 may have a pattern that slightly zig-zags near the center of the mulch 10 between the lateral edges 16, 18 so that the thickness of the combustible cord 24 is not located in consistent alignment as the mulch 10 is rolled up. Such a zig-zag pattern may not be necessary for relatively thin combustible cords 24.

The combustible cord 24 may be any cord capable of burning in a controlled manner. The combustion of the combustible cord 24 should also be self-sustaining. In other words, once the combustible cord 24 is lit, it should continue burning for its entire length without relighting or any other assistance. Many suitable materials may be used for the combustible cord 24. Standard fuses used for fireworks, cannon fuse, or other types of wicks may be used to make the combustible cord 24. Preferably, the combustible cord 24 should be of a type that is water resistant and that property is often found in off-the-shelf firework fuses. The combustible cord 24 as used in the present invention, unlike firework fuses, can be a rapid burning type of cord because having a slow burn rate is not necessary. In some cases, having a very rapid burn rate for the combustible cord 24 may be desirable so a person using the mulch 10 can see the results of lighting the combustible cord 24 soon after doing so. As such, a flexible combustible cord 24 that has water resistant properties and can still be burned consistently after exposure to moisture is desirable.

Rows of seeds are planted at an appropriate spacing so that the plants 40 have room as they grow. There is no need to alter spacing of plants 40 when using the mulch 10 of this invention. The mulch 10 is unrolled over the soil 42 containing seeds at the time of planting and left in place until an appropriate time for its removal. The mulch 10 is held in place by burying its lateral edges 16,18. An upper surface 44 of the mulch 10 faces away from the soil 42 and a lower surface 45 of the mulch 10 faces the soil 42. The mulch 10 forms a canopy that acts as a greenhouse that protects the seeds until they develop into plants 40. The mulch 10 also provides weed suppression and moisture retention. The time for removal of the mulch 10 may depend on temperature, rainfall, how much sunlight was able to reach the ground, or any number of factors. Amongst all of the aforementioned factors, it is nearly impossible to predict the exact time the mulch 10 would need to be removed. A user of the mulch 10 will judge the appropriate time for its removal. That time for removal will also depend upon the crop the mulch 10 is used to cover. Upon determining removal of the mulch 10 is appropriate because of the weather being suitable for removal and/or the plants 40 have reached sufficient maturity to no longer need the protection of the mulch 10, a use will light an exposed end 46 of the combustible cord 24. Upon lighting the combustible cord 24 it will burn for the length of the mulch 10. FIG. 4 shows the combustible cord 24 after being lit. The combustible cord 24 is in direct contact with the mulch 10 so that when it burns, it does so with sufficient heat to separate the mulch 10 adjacent to the combustible cord 24. The separation of the mulch 10 is from a combination of melting and/or burning the mulch 10 with the heat of the combustible cord 24 as it burns. Once the combustible cord 24 has burned, the mulch 10 will open to leave the plants 40 exposed to the elements. Ultimately, the mulch 10 will degrade at a later time, so removal of the mulch 10 is not necessary because it will disintegrate at some point during the growing season.

The present invention is not limited to the details above, but may be modified within the scope of the following claims.

What is claimed is:

1. A method for planting crops comprising the steps of:
    planting a crop within soil;
    providing an elongate sheet of polymer mulch having lateral edges, said mulch allowing sunlight to pass through said polymer mulch, said polymer mulch including a combustible cord affixed thereto and located between said lateral edges;
    holding said polymer mulch to said soil over said plants and locating said combustible cord between said mulch and said soil;
    burning said combustible cord so that said polymer mulch separates along said cord.

2. The method of claim 1, wherein said combustible cord has an exposed end.

3. The method of claim 1, wherein said combustible cord is in direct contact with said sheet of polymer mulch.

4. The method of claim 1, wherein a portion of said mulch adjacent to one of said lateral edges is covered with said soil to hold said mulch adjacent to said soil.

5. A method for planting crops comprising the steps of:
    planting a crop within soil;
    providing an elongate sheet of mulch having lateral edges, said mulch including a combustible cord affixed thereto and located between said lateral edges;
    holding said mulch to said soil over said plants so that said cord is spaced from said plants;
    burning said combustible cord so that said mulch separates along said cord.

6. The method of claim 5, wherein said combustible cord has an exposed end.

7. The method of claim 5, wherein said combustible cord is in direct contact with said sheet of polymer mulch.

8. The method of claim 7, wherein a portion of said mulch adjacent to one of said lateral edges is covered with soil to hold said mulch adjacent to said soil.

* * * * *